(12) United States Patent
Ni et al.

(10) Patent No.: US 11,301,797 B2
(45) Date of Patent: *Apr. 12, 2022

(54) INTELLIGENT MEETING CLASSIFIER

(71) Applicant: Microsoft Technology Licensing, LLC, Redmond, WA (US)

(72) Inventors: Tachen Chester Ni, Bellevue, WA (US); Jessica Lundin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/031,535

(22) Filed: Sep. 24, 2020

(65) Prior Publication Data
US 2021/0012257 A1    Jan. 14, 2021

Related U.S. Application Data

(63) Continuation of application No. 15/490,802, filed on Apr. 18, 2017, now Pat. No. 10,817,822.

(51) Int. Cl.
*G06Q 10/00* (2012.01)
*G06Q 10/06* (2012.01)
(Continued)

(52) U.S. Cl.
CPC ....... *G06Q 10/0639* (2013.01); *G06F 40/279* (2020.01); *G06Q 10/06398* (2013.01);
(Continued)

(58) Field of Classification Search
CPC ........ G06Q 10/10; G06Q 10/06; G06Q 10/00; G06Q 10/109; G06Q 10/06398; G06Q 10/063; G06Q 10/0639; G06Q 10/1095
See application file for complete search history.

(56) References Cited

U.S. PATENT DOCUMENTS

2008/0005319 A1* 1/2008 Anderholm ......... H04L 41/0866
    709/224
2010/0235446 A1* 9/2010 Hehmeyer ......... H04N 21/8358
    709/205

(Continued)

OTHER PUBLICATIONS

Kim, Been, and Cynthia Rudin. "Learning about Meetings." Data Mining and Knowledge Discovery 28.5-6 (2014): 1134-57. (Year: 2014).*

*Primary Examiner* — William S Brockington, III
(74) *Attorney, Agent, or Firm* — Michael Best & Friedrich LLP

(57) ABSTRACT

Techniques and technologies for using an intelligent meeting classifier to assess and enhance a work-related productivity are described. In at least some embodiments, a system includes a processing component operatively coupled to a memory; a productivity analyzer configured to perform operations including classifying one or more calendar events based at least partially on calendar data associated with one or more users; assessing one or more productivity metrics based at least partially on one or more calendar event classifications; determining one or more situation-enhancing operations based on the assessed one or more productivity metrics; and performing the one or more situation-enhancing operations.

13 Claims, 8 Drawing Sheets

(51) Int. Cl.
*G06Q 10/10* (2012.01)
*G06F 40/279* (2020.01)
*G06F 16/38* (2019.01)
*G06F 16/33* (2019.01)

(52) U.S. Cl.
CPC ....... *G06Q 10/109* (2013.01); *G06Q 10/1095* (2013.01); *G06F 16/3344* (2019.01); *G06F 16/38* (2019.01)

(56) References Cited

U.S. PATENT DOCUMENTS

| | | | |
|---|---|---|---|
| 2016/0125346 A1* | 5/2016 | Krantz | G06Q 10/06395 |
| | | | 705/7.41 |
| 2016/0183687 A1* | 6/2016 | Hoyt | A47C 31/126 |
| | | | 297/217.2 |
| 2017/0116552 A1* | 4/2017 | Deodhar | G06Q 10/06316 |
| 2017/0132229 A1* | 5/2017 | Parihar | G06F 16/9024 |
| 2018/0181544 A1* | 6/2018 | Zhang | G06N 3/0454 |
| 2018/0260788 A1* | 9/2018 | Cunico | G06N 5/043 |

* cited by examiner

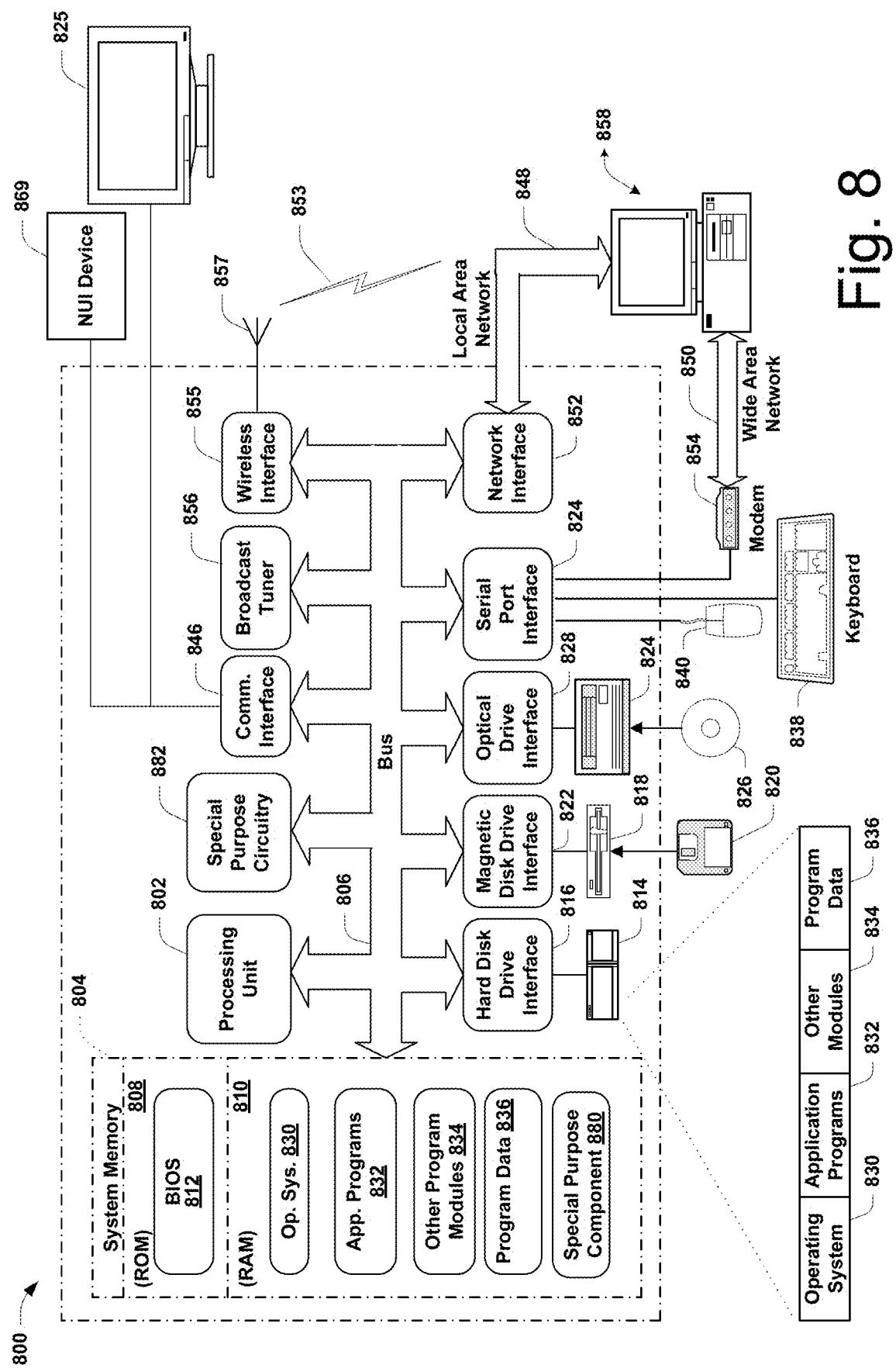

INTELLIGENT MEETING CLASSIFIER

RELATED APPLICATIONS

This application is a continuation of U.S. patent application Ser. No. 15/490,802, filed Apr. 18, 2017, the entire content of which is hereby incorporated by reference.

BACKGROUND

Understanding how a person spends time is important for assessing the person's work-related productivity and personal well-being. One tool that may provide valuable information for determining how a person (e.g. an employee) spends their time is an electronic calendaring application. Calendaring applications generally enable a user to exchange electronic meeting notices with other users via electronic communications (e.g. email), and also enable the user to make other calendar entries that serve a variety of other purposes. Thus, a user may use a calendaring application to schedule a variety of work-related activities (e.g. arrange and attend meetings, reminders to call clients, etc.), and to schedule variety of personal activities (e.g. exercise time, doctor appointments, birthday reminders, vacation, family activities, etc.). Although desirable results are being achieved using electronic calendaring applications, such calendaring applications currently remain an under-utilized source of information for assessing a user's work-related productivity and personal well-being.

SUMMARY

Techniques and technologies for using an intelligent meeting classifier to assess and enhance a work-related productivity are described.

For example, in at least some embodiments, a system for assessing and enhancing work-related productivity includes a processing component operatively coupled to a memory; a productivity analyzer at least partially disposed in the memory, the productivity analyzer including one or more instructions that when executed by the processing component perform operations including: classifying one or more calendar events based at least partially on calendar data associated with one or more users; assessing one or more productivity metrics based at least partially on one or more calendar event classifications; determining one or more situation-enhancing operations based on the assessed one or more productivity metrics; and performing the one or more situation-enhancing operations.

In addition, in at least some implementations, a method for assessing and enhancing a work-related productivity using one or more processing components of a computing device comprises: analyzing a textual content associated with a calendar event to determine one or more ngrams associated with the textual content of the calendar event; analyzing at least the one or more ngrams associated with the calendar event to assign a tag associated with the calendar event; and classifying the calendar event based at least partially on the tag associated with the calendar event; assessing one or more productivity metrics based at least partially on the one or more calendar event classifications; determining one or more situation-enhancing operations based on the assessed one or more productivity metrics; and performing the one or more situation-enhancing operations. In at least some implementations, the ngrams determined by analyzing the textual content associated with the calendar event may include one or more skip-grams. In addition, in some implementations, the method may further include obtaining meeting location information and, if applicable, user location information at the time of meeting; obtaining meeting meta data (e.g. online meetings); and obtaining generic meeting meta data (e.g., holidays, workdays vs. weekends), and analyzing these additional data as part of the determining of the one or more ngrams associated with the calendar event.

In at least some further implementations, a system for assessing and enhancing work-related productivity, comprises: circuitry for analyzing a textual content associated with a calendar event to determine one or more ngrams associated with the textual content of the calendar event; circuitry for analyzing at least the one or more ngrams associated with the calendar event to assign a tag associated with the calendar event; circuitry for classifying the calendar event based at least partially on the tag associated with the calendar event; circuitry for assessing one or more productivity metrics based at least partially on the one or more calendar event classifications; circuitry for determining one or more situation-enhancing operations based on the assessed one or more productivity metrics; and circuitry for performing the one or more situation-enhancing operations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical components.

FIG. 8 shows an embodiment of a computer system environment for using an intelligent meeting classifier to assess and enhance a user's work-related productivity.

DETAILED DESCRIPTION

The present disclosure describes techniques and technologies for using an intelligent meeting classifier to assess and enhance a user's work-related productivity. As noted above, electronic calendaring applications generally enable a user to perform a variety of organizational tasks. For an organization (e.g. a business unit) that includes a group of such users, the electronic calendaring applications used by the members of the organization may provide valuable information enhance the organization's productivity. Up to now, however, such calendaring applications have remained a largely under-utilized source of information for assessing a user's (or organization's) work-related productivity and personal well-being.

As described more fully below, techniques and technologies for using an intelligent meeting classifier to assess and enhance a user's work-related productivity in accordance with the present disclosure may advantageously provide substantial operational improvements in comparison with conventional technologies. Such improvements may be realized in terms of a user's performance of their employment responsibilities, and may also be realized in terms of improved operational aspects of computers or other devices operated by the user during the performance of their duties.

For example, as described more fully below, techniques and technologies for using an intelligent meeting classifier to assess and enhance a user's work-related productivity in accordance with the present disclosure may advantageously enable users to improve or optimize their activities (e.g. mitigate distractions, etc.) that may otherwise cause them to use their computers and other devices inefficiently. In this way, techniques and technologies disclosed herein may enable one or more tasks performed by the user on a computer or other device to be performed more efficiently or effectively, using fewer computational operations, fewer processing cycles, and less energy consumption (e.g. less battery power) in comparison with conventional techniques and technologies.

More specifically, in at least some implementations, techniques and technologies for using an intelligent meeting classifier to assess and enhance a user's work-related productivity in accordance with the present disclosure may collect productivity-related data from a user's device, including information from a user's electronic calendaring application, classify the meetings and activities determined from the calendaring information, assess a productivity metric based on such meetings and activities, and perform one or more operations associated with enhancing productivity based on the assessed productivity metric.

Figure 1:
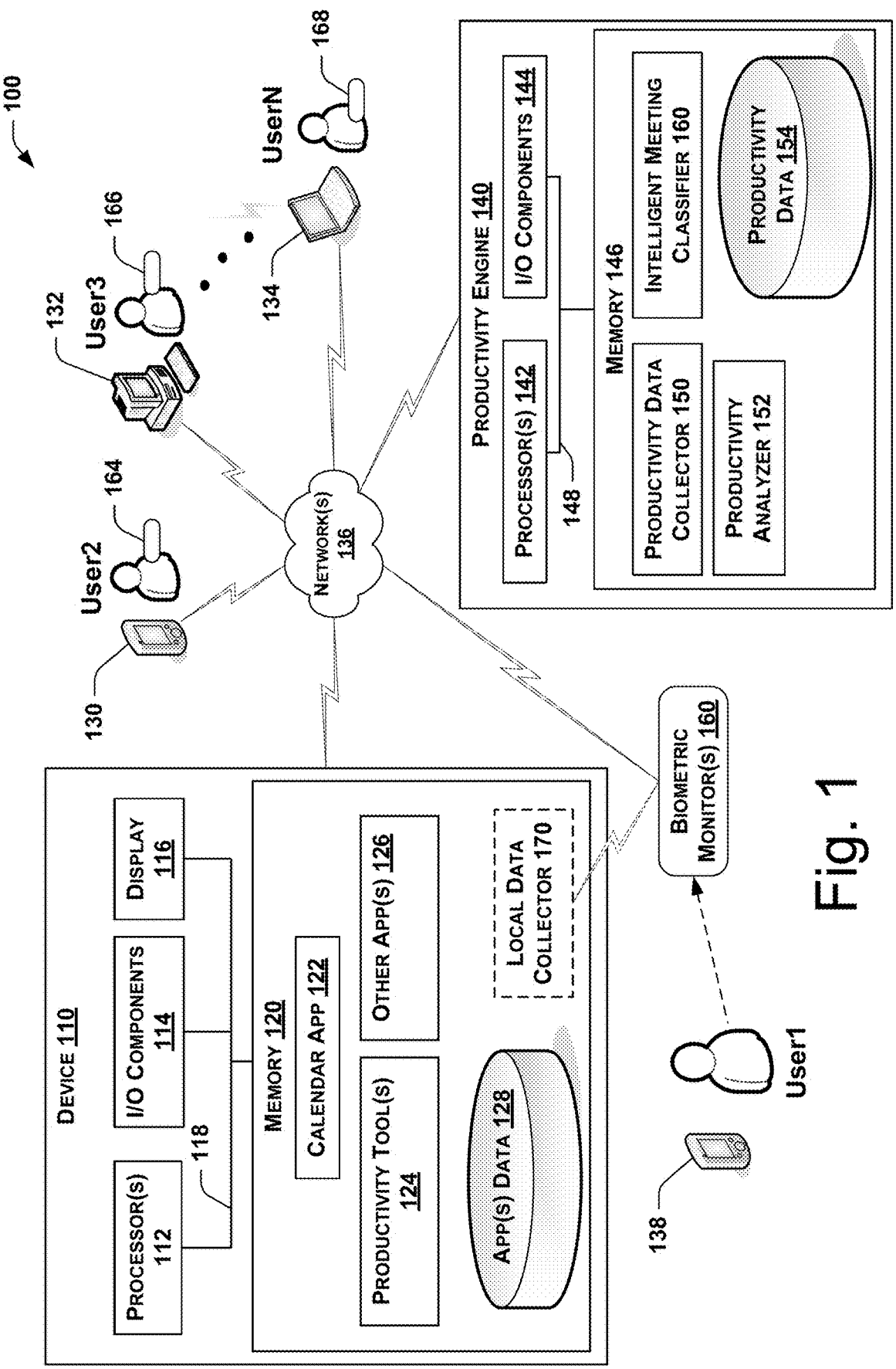
FIG. 1 shows an embodiment of an environment for using an intelligent meeting classifier for assessing and enhancing productivity.

For example, FIG. 1 shows an embodiment of an environment 100 for using an intelligent meeting classifier for assessing and enhancing productivity in accordance with the present disclosure. In this embodiment, the environment 100 includes a device 110 associated with a first user (User1), the device 110 having one or more processing components 112, one or more input/output (I/O) components 114, and a display 116 operatively coupled to a memory 120 by a bus 118. The memory 120 may include a basic input/output system (BIOS) (not shown), which provides basic routines that help to transfer information between elements within the device 110, and an operating system (not shown) that manages and provides common services to the various elements of the device 110.

As further shown in FIG. 1, the device 110 associated with the first user (User1) includes a calendar application 122, one or more productivity tools 124, and one or more other (or non-productivity) applications 126 installed within the memory 120. In addition, applications data 128 generated by the calendar application 122, the one or more productivity tools 124, and the one or more other applications 126 may be stored in the memory 120.

In the representative environment 100 shown in FIG. 1, the device 110 is operable to communicate with a productivity engine 140, and with other user devices (e.g. devices 130, 132, 134) associated with other users (e.g. User2, User3, UserN) via one or more networks 136. In addition, a mobile device 138 is also associated with the first user (User1), and is operable to communicate via the one or more networks 136 with the other devices and with the productivity engine 140. The productivity engine 140 is configured to perform one or more aspects of techniques for assessing and enhancing productivity in accordance with the present disclosure, as described more fully below.

In the environment 100 depicted in FIG. 1, for the sake of clarity, there are two devices (110, 138) associated with the first user (User1), and one device associated with each of the other users (e.g. device 130 associated with User2, device 132 associated with User3, and device 134 associated with UserN), however, it will be appreciated that in alternate implementations, multiple devices may also be associated with one or more of the other users, and additional devices may be associated with the first user (User1). In some implementations, the other user devices (130, 132, 134) associated with the other users (User2, User3, UserN) may be configured similarly to the device 110 associated with the first user (User1).

The calendar application 122 of the device 110 may be any of a variety of commercially-available calendaring applications, such as the Outlook® application available from Microsoft Corporation of Redmond, Wash. In general, the calendaring application 122 enables a user to exchange electronic meeting notices with other users via electronic communications (e.g. email), and also enables the user to make other calendar entries that serve a variety of other purposes. Thus, a user may use a calendaring application to schedule a variety of work-related activities (e.g. arrange and attend meetings, reminders to call clients, etc.), and to schedule variety of personal activities (e.g. exercise time, doctor appointments, vacation, birthday reminders, etc.).

In at least some implementations, the one or more productivity tools 124 of the device 110 may include one or more primary productivity applications, one or more messaging applications (e.g. email, instant messages, etc.), or any other productivity applications. For example, in at least some implementations, the one or more primary productivity application may include an application that enables a user to accomplish their primary work-place responsibilities, such as a word-processing application (e.g. Microsoft Word®), an application for creating drawings (e.g. Microsoft Visio®), a spreadsheet application (Microsoft Excel®), a presentation application (e.g. Microsoft Power-Point®), a computer-aided design (CAD) application (e.g. Catia® by Dassault Systems, AutoCAD® by CDW, etc.), an accounting application (e.g. Quicken® or Quickbooks® by Intuit), a web-browsing application (e.g. Internet Explorer®, Chrome®, Firefox®, etc.), or any other suitable productivity tools. It should be appreciated that, in at least some implementations, at least some of the one or more productivity tools 124 may be packaged or combined into a single application or suite of applications. For example, in at least some implementations, the messaging and calendaring capabilities may be combined in to a single application suite, such as the Microsoft Outlook® product.

The one or more other applications 126 of the device may generally include any applications that are generally not categorized as one of the productivity tools 124. For example, in at least some implementations, the one or more other applications 124 may include a social media application (e.g. Facebook, Twitter, Snapchat, etc.), a gaming application, or any other type of non-productivity application. It will be appreciated that the one or more productivity tools 124 and the other applications 126 are not rigidly defined and may not be mutually exclusive, and that for some users on some devices, an application may be a productivity tool 124 (e.g. web-browsing application, social media application, etc.), while for other users, the same application may be considered a non-productivity application 126. In addition, like the calendar application 122, it will be appreciated that an application may sometimes be used for productivity purposes and sometimes for non-productivity purposes (e.g. a web-browsing application).

It will be appreciated that the representative environment 100 shown in FIG. 1 is merely one representative environment in which techniques and technologies for using an intelligent meeting classifier to assess and enhance a user's work-related productivity may be implemented, and that such techniques and technologies are not necessarily limited to the particular environment 100 shown in FIG. 1. For example, in at least some alternate implementations, one or more of the calendar application 122, the productivity tools 124, the other applications 126, and the applications data 128 may be located in a distributed (or cloud-based) environment that the users may access using their associated devices via the one or more networks 136, such as on the productivity engine 140 or one or more suitable cloud-based servers.

In addition, it will be appreciated that the device 110 (and devices 130, 132, 134) may represent a variety of possible device types, including but not limited to a personal computer, a laptop computer, a notebook computer, a tablet computer, a slate computer, a handheld device, such as a cellular telephone, a Personal Data Assistant (PDA), a smart watch, or any other suitable device. It should be understood, however, that the device 110 (and devices 130, 132, 134) is not limited to these particular example devices, and may represent a server, a mainframe, a workstation, a distributed computing device, a portion of a larger device or system (e.g. a control component of a distributed computing device), or any other suitable type of device. In still other embodiments, the device 110 (or devices 130, 132, 134) may be a television, a wearable device, a vehicle (or portion of a vehicle), an appliance (or portion of an appliance), a consumer product, a component of the Internet of Things, or virtually any other suitable device.

Referring again to FIG. 1, in at least some implementations, one or more biometric monitors 160 may be operatively associated with the first user (User1) to record biometric data regarding one or more biometric aspects of the first user (User1). In an example, the term "biometric data" refers to information or signals (e.g. digital data) resulting from the capture or sensing of one or more characteristics of a living entity (e.g. User1).

For example, in at least some implementations, the one or more biometric monitors 160 may collect data regarding one or more of respiration (e.g. rate, volume, duration, pattern, etc.), heart rate, blood pressure, temperature, perspiration, skin conductivity, brain activity data (e.g. brain waves, brain temperature data, electroencephalogram (EEG) etc.), step counts, calories burned, or any other suitable biometric aspects of the first user (User1). At least some of the one or more biometric monitors 160 may be worn by (or in contact with) the first user (User1), or alternately, may be operatively positioned in the vicinity of the first user (User1) to sense biometric data in a non-contacting manner. The one or more biometric monitors 160 may be any of a variety of generally-known devices for sensing one or more characteristics of the first user (User1). For example, the one or more biometric monitors 160 may include one or more of the devices commercially-available from Spire, Inc., Fitbit, Inc., Jawbone, Inc., Garmin, Inc., Apple, Inc., Adidas, Inc. and a variety of other suitable devices.

In some implementations, the one or more biometric monitors 160 may transmit at least some of the collected biometric data via the one or more networks 136 to the productivity engine 140. Alternately, in some other implementations, the one or more biometric monitors 160 may transmit at least some of the collected biometric data to a local data collector 170 stored within the memory 120 of the device 110, whereupon the device 110 may transmit the collected biometric data from the local data collector 170 to the productivity engine 140 via the one or more networks 136 at a suitable time (e.g. periodically, non-periodically, upon satisfaction of a condition, upon the device 110 reconnecting to the one or more networks 136, etc.). Similarly, in at least some implementations, the environment 100 may further include one or more biometric monitors 164 operatively associated with a second user (User2), one or more biometric monitors 166 operatively associated with a third user (User3), and one or more biometric monitors 168 operatively associated with an $n^{th}$ user (UserN).

With continued reference to FIG. 1, in at least some implementations, the productivity engine 140 includes one or more processors 142 and one or more I/O components 144 operatively coupled to a memory 146 by a bus 148. In at least some implementations, the memory stores 146 stores a productivity data collector 150, a productivity analyzer 152, productivity data 154, and an intelligent meeting classifier 160.

The productivity data collector 150 may be configured to collect one or more types of information or data from the device 110 (and other devices 130, 132, 134, 138). The productivity data collector 150 may also be configured to collect data from the one or more biometric monitors 160 (and other monitors 164, 166, 168). The productivity data collector 150 may also store the collected data and information as the productivity data 154. The devices (110, 130, 132, 134, 138) of the environment 100 may generally be equipped with one or more position (or location) sensors, cameras, microphones, accelerometers, or other instrumentation, applications, and functionalities for gathering a wide variety of information from one or more users that may be included in the productivity data 154. The productivity data 154 may therefore include data for the first user (User1), or one or more other users (e.g. User2, User3, UserN), which may be processed and analyzed to determine various metrics related to productivity of the first user (User1), or one or more other users, as described more fully below.

The intelligent meeting classifier 160 may be operable to access and analyze calendar data included within the productivity data obtained by the productivity data collector 150, and to classify one or more of the events contained in the calendaring data. The productivity analyzer 152 may then analyze the productivity data 154, including the output from the intelligent meeting classifier 160, to assess one or more productivity metrics, and in at least some implementations, provides one or more situation-enhancing operations. For example, in at least some implementations, the assessing of one or more productivity metrics by the productivity analyzer 152 may be accomplished using a statistical inference server (e.g. Microsoft Azure®, etc.) to statistically analyze one or more portions of the productivity-related data to determine one or more insights therefrom. Various operations that may be performed by the components of the productivity engine 140 (e.g. productivity data analyzer 152, intelligent meeting classifier 160, etc.) are described more fully below.

Figure 2:
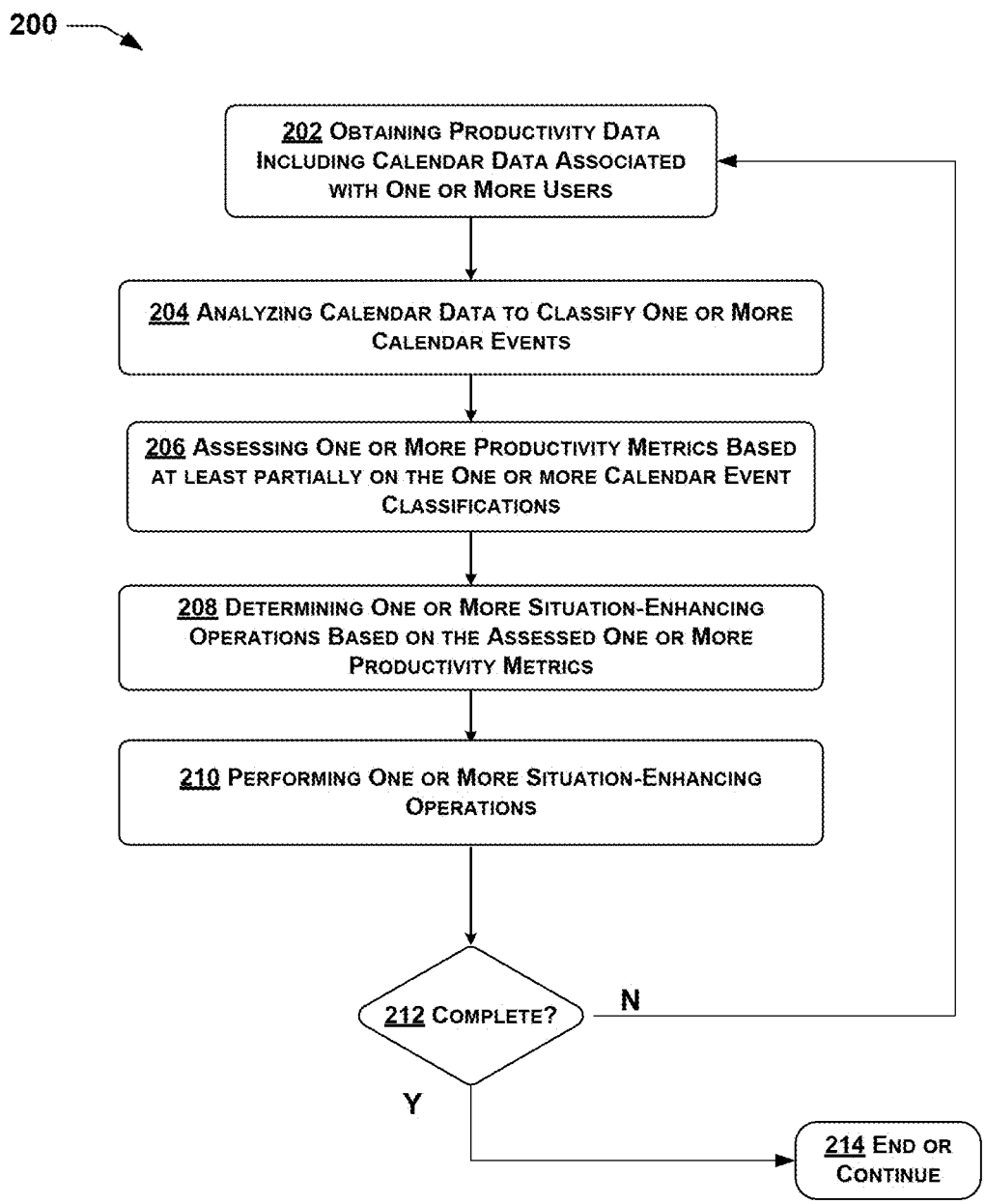
FIG. 2 shows an embodiment of a process for using an intelligent meeting classifier for assessing and enhancing productivity.

FIG. 2 shows an embodiment of a process 200 for using an intelligent meeting classifier for assessing and enhancing productivity in accordance with the present disclosure. In general, the process 200 may be performed by the productivity engine 140, or other suitable device or system appropriately configured to perform the described operations. In the embodiment shown in FIG. 2, the process 200 includes obtaining productivity data including calendar data associated with one or more users at 202. For example, the obtaining calendar data (at 202) may include the productivity data collector 150 of the productivity engine 140 obtaining the calendar data from the applications data 128 stored in the memory 120 of the device 110.

At 204, the process 200 includes analyzing calendar data to classify one or more calendar events. For example, the analyzing calendar data (at 204) may include the intelligent meeting classifier 160 analyzing the calendar data to classify one or more calendar events as business meetings, business-related reminders, personal meetings, exercise time, or a variety of other possible categories. Additional details regarding operations that may be performed during the analyzing of the calendar data (at 204) are described more fully below with respect to FIGS. 3 through 5.

In the embodiment shown in FIG. 2, the process 200 further includes assessing one or more productivity metrics based at least partially on the one or more calendar event classifications at 206. For example, in at least some embodiments, the assessing one or more productivity metrics (at 206) may include the productivity analyzer 152 analyzing the output from the intelligent meeting classifier 160 and assessing one or more metrics using only the one or more calendar event classifications determined from the calendar data. Alternately, in at least some implementations, the assessing of one or more productivity metrics (at 206) may include the productivity analyzer 152 analyzing the output from the intelligent meeting classifier 160 in combination with other information contained within the productivity data 154 (obtained at 202), such as biometric data obtained using the one or more biometric monitors (160, 164, 166, 168), positioning information (e.g. global positioning system (GPS) data, etc.), or other suitable information.

In at least some embodiments, the assessing one or more productivity metrics (at 206) may include the productivity analyzer 152 analyzing the output from the intelligent meeting classifier 160 and assessing one or more metrics using only the one or more calendar event classifications determined from the calendar data. For example, in some embodiments, the assessing of one or more productivity metrics (at 206) may include determining time spent in meetings, time spent in collaborations, time spent exercising, time spent doing personal activities, or other measures of time. Such information may be used to assess whether an inordinate amount of time is spent working, in meetings, or handling personal matters (e.g. compared with baseline, average, or suggested time limits, or employer-mandated time parameters), or to make sure that proper or acceptable ratios of such events are being observed (e.g. collaboration time to meeting time, work time versus personal time, etc.).

Alternately, in at least some implementations, the assessing of one or more productivity metrics (at 206) may include a waste productivity metric. More specifically, in at least some implementations, the waste productivity metric may include analyzing or aggregating time spent in one or more calendar events that may be considered wasteful or relatively non-productive (e.g. personal and social appointments but may exclude exercise, travel time, etc.). In some implementations, a stress productivity metric may be assessed based at least partially on one or more of utilization of work days, amount of after-hours work (e.g. meetings outside normal business days and hours), double-booked hours (e.g. times when two business meetings scheduled at the same time), or fragmentation (e.g. counts the "flow time" available to a person to get work done, defined as two-hour blocks of time that are uninterrupted by meetings).

In addition, in at least some implementations, a complexity productivity metric may be assessed that may be based at least partially on one or more of redundancy (e.g. multiple meetings on same topic, multiple layers of employees from the same group in a project level meeting, etc.), collaboration across teams (e.g. percentage of any team's time spent with other teams), or process cost (e.g. the cost of time spent in meetings corresponding to a set of ngrams (which may include one or more skip-grams), and/or rules). In further implementations, a customer focus productivity metric may be assessed that may be based on one or more of time with customers (or clients) (e.g. percentage of meeting time spent with external people), customer network size (e.g. time or number of external people per month), customer network breadth (e.g. number of connections with different domains outside company over a selected time period), or customer centrality (e.g. a high centrality means a person is socially important in a network).

And in at least some implementations, an engagement productivity metric may include an assessment of one or more of internal network size (e.g. connections a person maintains in a month), internal network breadth (e.g. meeting time with other departments per month), insularity (e.g. percentage of activity that involved only members of the same group), manager 1:1 hours (e.g. time per week spent in 1:1 meetings with supervisor), or network velocity (e.g. pace at which new connections are added every month). It will be appreciated that a wide variety of additional productivity metrics may be conceived and determined as desired, and that the techniques and technologies for using an intelligent meeting classifier to assess and enhance work-related productivity are not limited to the particular productivity metrics described herein.

As further shown in FIG. 2, the process 200 further includes determining one or more situation-enhancing operations based on the assessed one or more productivity metrics at 208. For example, the productivity analyzer 152 may analyze the one or more assessed productivity metrics (for example, the productivity metrics assessed at 206) and may select from a database of possible situation-enhancing operations based on the one or more assessed productivity metrics. The one or more situation-enhancing operations (determined at 208) may be selected based on a desire to improve productivity of an individual user, or of a group of users, or of an entire organization, or may be selected to provide substantial operational improvements in the operations of one or more computers operated by one or more users of a computing environment.

For example, in at least some implementations, the determining one or more situation-enhancing operations (at 208) may include determining that an adjustment of one or more aspects of the one or more productivity tools or other applications that are installed on a user's device is recommended (e.g. tools 124 or applications 126 on device 110 associated with User1). For example, the determining one or more situation-enhancing operations (at 208) may include determining that one or more aspects or functionalities of a productivity tool (124) or other application (126) may be disabled to enhance or promote the user's work productivity (e.g. disable or limit web browsing, disable emailing to non-work-related domains, etc.). Similarly, the determining one or more situation-enhancing operations (at 208) may include determining that one or more aspects or functionalities of a device (110) may be powered-down (or switched to efficiency-improving modes of operation) to conserve power, reduce processing cycles, reduce memory consumption, or other efficiency-improving operations.

In further implementations, the determining one or more situation-enhancing operations (at 208) may include determining that an adjustment of one or more aspects of displayed items to improve productivity is recommended. For example, in at least some implementations, the determining one or more situation-enhancing operations (at 208) may include determining that an adjustment of one or more aspects of a display of an upcoming meeting on an electronic calendar application to indicate whether or not the user's attendance at the meeting would be consistent with the one or more aspects of a user's productivity (e.g. display recommended meetings in bold or solid lines, display meetings that are not recommended in dashed lines or de-emphasized text, etc.).

In further implementations, the determining one or more situation-enhancing operations (at 208) may include determining that an upcoming meeting appearing on the user's electronic calendar appears to be consistent with enhancing the user's productivity, and then providing an indication that appearance of the meeting in the user's electronic calendar should be displayed in a manner (e.g. with a bright background, with a green indicator, etc.) indicating that the user is encouraged or recommended to attend the meeting. Similarly, in further implementations, On the other hand, the determining one or more situation-enhancing operations (at 208) may include determining that an upcoming meeting appearing on the user's electronic calendar appears to be inconsistent with the user's productivity (e.g. based on one or more assessed metrics), the appearance of the meeting in the user's electronic calendar may be displayed in a second manner (e.g. with a dim background, with a red indicator, etc.) indicating the user is discouraged or not recommended to attend the meeting.

In still further implementations, the determining one or more situation-enhancing operations (at 208) may include determining that delaying delivery of one or more electronic messages (e.g. email messages, instant messages, etc.) if such delaying would be consistent with enhancing the user's productivity. For example, based on a classification of a calendar event, the determining one or more situation-enhancing operations (at 208) may include determining that one or more electronic messages should be delayed rather than being delivered during the calendar event. More specifically, the possible delaying of electronic messages may be dependent upon various factors, such as whether the electronic message is from a person of higher authority (or a client or customer, a personal friend, etc.), or whether the message has been indicated as being high importance, or whether the message is personal or business related (e.g. based on an identity of sender, based on content in a subject or header of the message, etc.), or based on any other suitable factor.

Similarly, in at least some implementations, the determining one or more situation-enhancing operations (at 208) may include determining that one or more notifications could be provided to the user containing suggestions or recommendations intended educate or advise the user regarding possible ways to improve productivity. For example, the determining one or more situation-enhancing operations (at 208) may include determining that a situation-enhancing notification (e.g. a pop up window, an electronic message, a text, an audible message, an automated call, etc.) should be provided on a device associated with a user indicating that a certain threshold (e.g. a goal, a pre-established limit, target, etc.) has been reached regarding one or more productivity metrics (e.g. time spent in meetings, collaborations, exercise or movement, etc.). The notification may be a written (or textual) message, or alternately, may include a non-visually based notification (e.g. audible notification, etc.). In further implementations, the determining one or more situation-enhancing operations (at 208) may include determining that one or more haptic notifications (or prompts) intended to improve productivity could be provided to the user. Of course, the situation-enhancing operations determined at 208 are not necessarily limited to these particular examples, and that other suitable situation-enhancing operations may be determined.

Referring again to FIG. 2, the process 200 further includes performing one or more situation-enhancing operations at 210. It will be appreciated that the situation-enhancing operations that may be performed at 210 may include any of the particular examples of situation-enhancing operations that are described above as possibly being determined at 208. For example, in at least some implementations, the performing one or more situation-enhancing operations (at 210) may include adjusting of one or more aspects of the one or more productivity tools or other applications that are installed on a user's device. In further implementations, the performing one or more situation-enhancing operations (at 210) may include adjusting one or more aspects of displayed items to improve productivity. Similarly, in at least some implementations, the performing one or more situation-enhancing operations (at 210) may include providing one or more notifications to the user containing suggestions or recommendations intended educate or advise the user regarding possible ways to improve productivity. In further implementations, the performing one or more situation-enhancing operations (at 210) may include providing one or more haptic prompts to the user intended to improve productivity. In addition, the situation-enhancing operations that may be performed at 210 are not necessarily limited to the particular examples describe above, and that other suitable situation-enhancing operations may be performed at 210.

As further shown in FIG. 2, in this embodiment, the process 200 includes determining whether the process 200 is complete at 212, and if not, the process 200 returns to operation 202 and repeats operations 202 through 210 to determine and perform additional situation-related operations. Once it is determined (at 212) that the process 200 is complete, the process 200 ends or continues to other operations at 214.

It will be appreciated that techniques and technologies for using an intelligent meeting classifier to assess and enhance a user's work-related productivity as disclosed herein may provide substantial operational improvements in the operations of one or more computers operated by one or more users of an environment in comparison with conventional technologies. For example, in at least some implementations, techniques and technologies in accordance with the present disclosure may advantageously enable users to at least partially mitigate distractions that may otherwise cause them to use their computers and other devices (or the one or more productivity tools operating on their computers and other devices) inefficiently. The resulting improvements in productivity may advantageously result in one or more tasks being performed on a device by the user to be performed more efficiently, using fewer computational operations, fewer computational processing cycles, and less energy consumption (e.g. less battery power) in comparison with conventional techniques.

Figure 3:
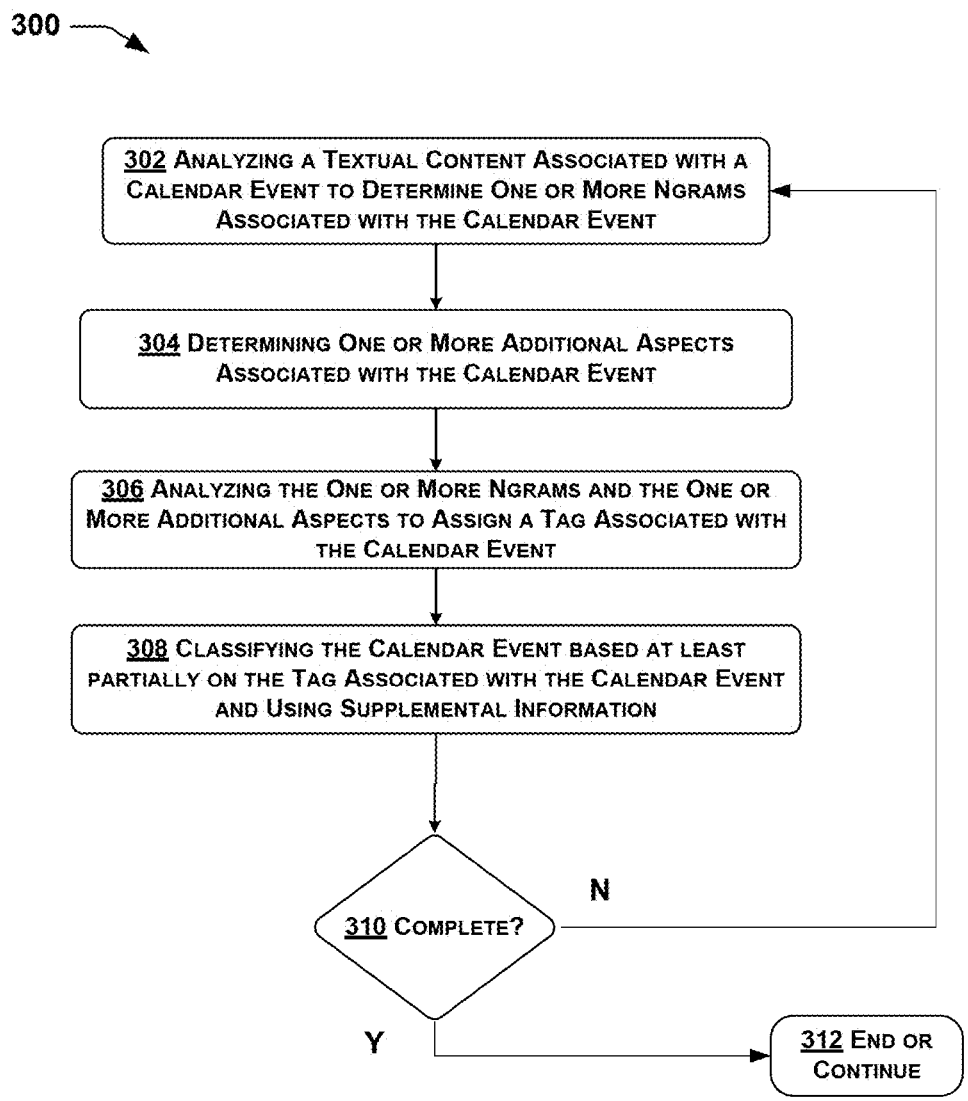
FIG. 3 shows an embodiment of a process for analyzing calendar data to classify one or more calendar events.

As noted above, the process 200 for using an intelligent meeting classifier for assessing and enhancing productivity includes analyzing calendar data to classify one or more calendar events (at 204). More specifically, FIG. 3 shows an embodiment of a process 300 for analyzing calendar data to classify one or more calendar events in accordance with the present disclosure. In this embodiment, the process 300 includes analyzing a textual content associated with a calendar event to determine one or more ngrams associated with the calendar event at 302. As is generally known, an ngram is a sequence of n items from a given portion of text (e.g. n=1, 2, 3, 4, etc.), wherein the items may be any suitable units (e.g. words, phonemes, syllables, etc.). In at least some implementations, the one or more ngrams may include one or more skip-grams. Ngrams can be extended to skip-grams where items do not need to be next to each other. In at least some implementations, the textual content that is analyzed (at 302) may be a subject heading associated with the calendar event. Alternately, in some implementations, the textual content may be a message body or metadata associated with the calendar event, or a combination of one or more of subject heading, event body, or metadata, or any other suitable textual content associated with the calendar event.

Figure 4:
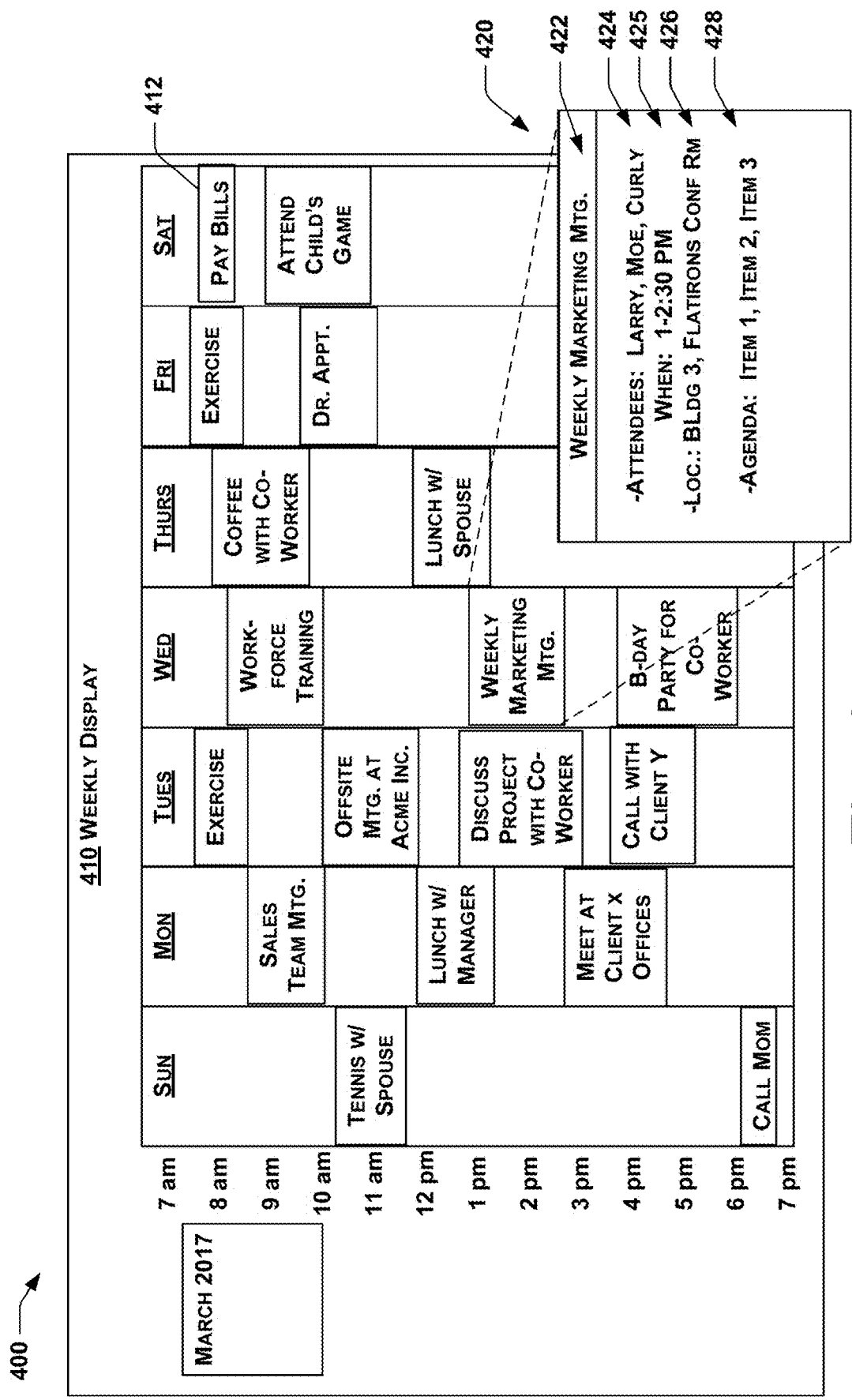
FIG. 4 shows an embodiment of a user interface of an electronic calendar.

For example, FIG. 4 shows an embodiment of a user interface 400 of an electronic calendar application (e.g. calendar application 122). In this embodiment, the user interface 400 shows a weekly display 410 depicting the days of the week and a variety of calendar events that have been scheduled. A subject heading (e.g. subject heading "Pay Bills" 412) may be visible for each calendar event shown in the weekly display 410. In addition, when a user selects a particular calendar event (e.g. by selecting with a cursor device), a calendar event window 420 associated with the selected calendar event may become visible that may include a subject heading 422 (e.g. "Weekly Marketing Mtg."), and may also include additional information regarding the calendar event such as one or more attendees 424, a time (or duration) of the calendar event 425, a location of the event 426, an event body 428 (e.g. agenda items, an attached item or file, etc.), or other relevant information. In addition to these visible items of information shown in the calendar event window 420, other information associated with the calendar event may not be visible in the user interface 400 (e.g. metadata) but may nevertheless be available (e.g. in applications data 128) for analysis by the productivity engine 140 for classifying the one or more calendar events.

Referring again to FIG. 3, after analyzing a textual content associated with a calendar event to determine one or more ngrams (which may include one or more skip-grams) associated with the calendar event (at 302), the process 300 includes determining one or more additional aspects associated with the calendar event at 304. For example, in at least some implementations, the determining one or more additional aspects (at 304) may include determining one or more other attendees (or lack of other attendees) associated with the calendar event, such as one or more other meeting attendees (424). Similarly, the determining one or more additional aspects (at 304) may include determining a time (or duration) of the calendar event (425), a location of the calendar event (426), or any other relevant information regarding the calendar event (428) (e.g. agenda items).

Referring again to FIG. 3, after determining one or more additional aspects associated with the calendar event (at 304), the process 300 further includes analyzing the one or more ngrams (which may include one or more skip-grams) and the one or more additional aspects to assign one or more tags associated with the calendar event at 306. It will be appreciated that the one or more tags assigned to the calendar event may be selected from any suitable number of possible tags depending upon a desired degree of analytical fidelity. For example, in some implementations, the tag assigned to a calendar event may be selected from only two possible tags: a "work-related" tag or a "personal-related" tag. Such a two-tag system, however, may not provide a suitable or desired degree of fidelity to enable a detailed analysis of the myriad of possible calendar events and the many varied ways in which the calendar events may be assessed to determine productivity metrics (at 206). Therefore, in at least some implementations, a relatively greater number of tags may be established in order to enable a more detailed assessment of one or more productivity-related metrics, or to perform a more accurate determination of one or more productivity metrics (at 206) and therefore, one or more situation-enhancing operations (at 208).

Figure 5:
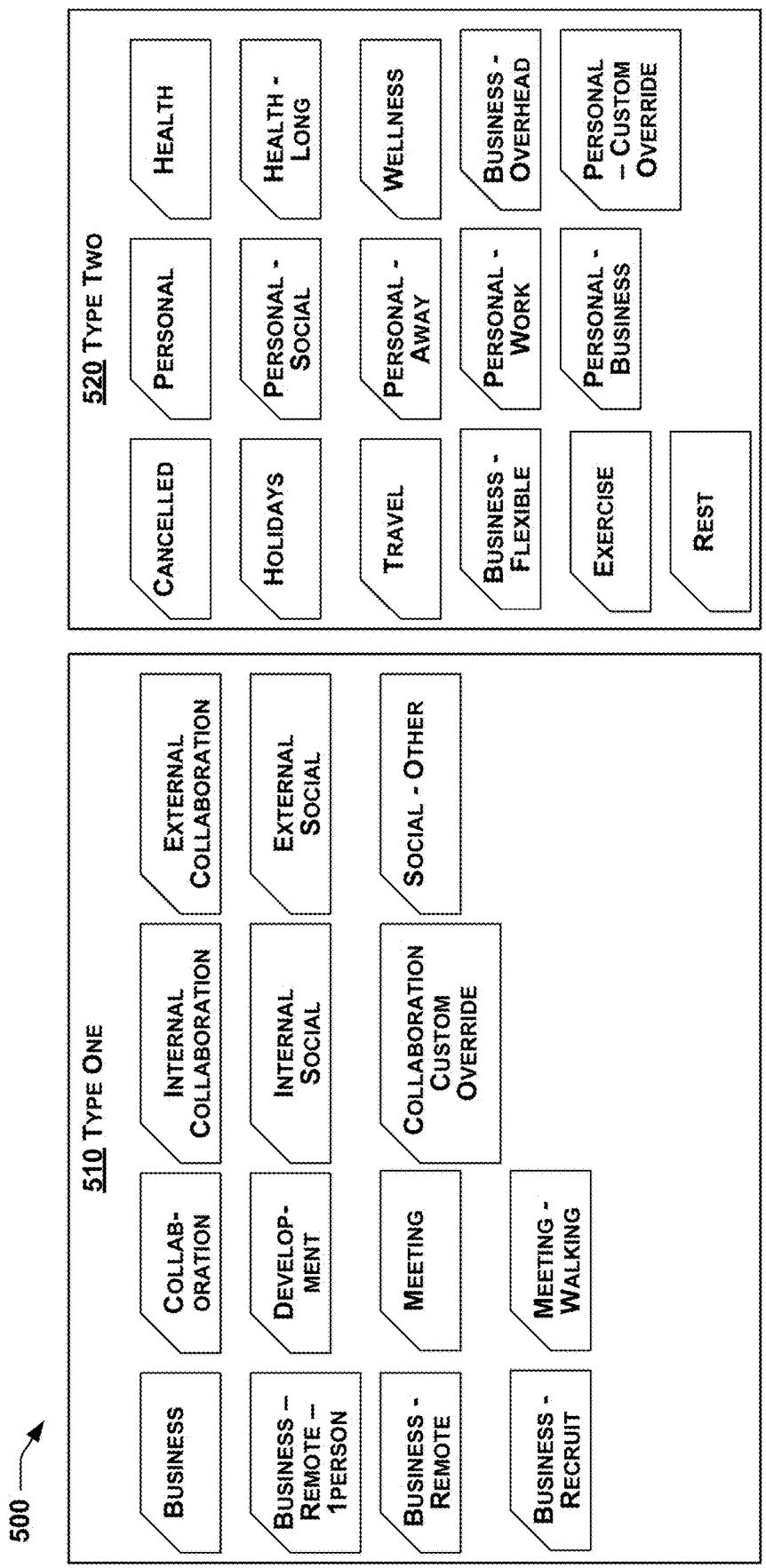
FIG. 5 shows an embodiment of a tagging arrangement that may be used to classify one or more calendar events.

For example, FIG. 5 shows an embodiment of a tagging arrangement 500 that may be used to classify one or more calendar events. In this embodiment, the tagging arrangement 500 includes a first plurality of type one tags 510 and a second plurality of type two tags 520. In this representative tagging arrangement 500, the type one tags 510 include, but are not limited to, the following tags: "business," "collaboration," "internal collaboration," "external collaboration," "business-remote-1 person," "development," "internal social," "external social," "business-remote," "collaboration-custom override," "meeting," "business-recruit," "meeting—walking," and "social—other." Similarly, in this representative tagging arrangement 500, the type two tags 520 include, but are not limited to, the following tags: "cancelled," "personal," "health," "holidays," "personal-social," "health-long," "travel," "personal-away," "wellness," "business-flexible," "personal-work," "business-overhead," "personal-business," "exercise," "rest," and "personal-custom override." Of course, in alternate implementations, a greater or lesser number of tags may be used.

It will be appreciated that the analyzing of the one or more ngrams (which may include one or more skip-grams) and the one or more additional aspects to assign one or more tags associated with the calendar event (at 306) may be performed in a variety of ways. For example, in at least some implementations, the analyzing of the ngrams may initially serve to narrow the number of possible tags associated with the calendar event, and then the one or more additional aspects associated with the calendar event (e.g. other attendees, location, time of event, etc.) may further serve to match (or pinpoint) which tag is the most appropriate to assign to the calendar event.

For example, in at least some implementations, if one or more ngrams associated with a calendar event include a term that may be either a work-related event or a personal event (e.g. meeting), then an analysis of the attendees (e.g. other employees of the user's employer), or the time of the calendar event (e.g. during normal working hours) may lead to a conclusion that a calendar event is a work-related meeting and should be tagged accordingly (e.g. "internal collaboration"). Alternately, if one or more ngrams (which may include one or more skip-grams) associated with a calendar event include one or more terms that may be either a work-related event or a personal event (e.g. lunch, birthday, etc.), then an analysis of the attendees (e.g. the user's spouse), or the time of the calendar event (e.g. during a Saturday) may lead to a conclusion that a calendar event is a personal-related event and should be tagged accordingly (e.g. "personal—social"). Additional details regarding one or more operations that may be performed as part of analyzing of the one or more ngrams and the one or more additional aspects to assign one or more tags associated with the calendar event (at 306) are described below.

As further shown in FIG. 3, after analyzing of the one or more ngrams and the one or more additional aspects to assign one or more tags associated with the calendar event (at 306), the process 300 includes classifying the calendar event based at least partially on the tag associated with the calendar event and using supplemental information at 308. More specifically, in at least some implementations, the classifying the calendar event based at least partially on the tag associated with the calendar event and using supplemental information (at 308) may include correlating the tag associated with the calendar event to one or more items of supplemental information that may confirm that the user actually participated in (or performed) the calendar event.

More specifically, in at least some implementations, the supplemental information used during the classifying (at 308) may include one or more items of biometric data obtained using the one or more biometric monitors (160, 164, 166, 168). For example, if the tag (or one or more ngrams, which may include one or more skip-grams) associated with the calendar event indicates that the calendar event involved "exercise," then the classifying (at 308) may include analyzing one or more items of biometric data (e.g. heart rate, respiratory rate, perspiration, etc.) obtained using the one or more biometric monitors (160, 164, 166, 168) to confirm (or disconfirm) that the user actually spent the time in "exercise." Similarly, the classifying (at 308) may include analyzing one or more items of biometric data (e.g. heart rate, respiratory rate, perspiration, etc.) obtained using the one or more biometric monitors to confirm (or disconfirm) that the user actually spent the time in "rest." In further implementations, if the tag (or one or more ngrams, which may include one or more skip-grams) associated with the calendar event indicates that the calendar event involved a "walking meeting" (or "meeting—walking"), such as a discussion with a co-worker on a track or other walking venue, then the classifying (at 308) may include analyzing one or more items of biometric data obtained using the one or more biometric monitors to confirm (or disconfirm) that the user was "walking" during the time in question. Additional biometric data from one or more other attendees of the "walking meeting" may also be analyzed to confirm (or disconfirm) that the meeting was a "walking meeting" during the classifying of the calendar event (at 308). Furthermore, biometric data from one or more other attendees can be used to classify meetings as productive or non-productive ones. More specifically, in at least some implementations, one or more levels of engagement or moods from meeting attendees might be estimated from biometric data (e.g. heartrates, Galvin Skin Resistance (GSR), breathing rates, skin temperatures, etc.). If the biometric data indicates that a majority of meeting participants are disengaged or angry, the meeting may be classified as "non-productive." Conversely, if the biometric data indicates or suggests that most meeting participants are highly engaged or pleased, the meeting may be classified as "productive."

In still further implementations, the supplemental information used during the classifying (at 308) may include one or more items of position information obtained using one or more position sensors (e.g. GPS sensors, etc.). For example, in at least some implementations, if the tag (or one or more ngams) associated with the calendar event indicates that the calendar event involved a location other than the user's normal office location (e.g. "remote," "off-site," etc.), then the classifying (at 308) may include analyzing position information (e.g. GPS data) obtained during the time of the calendar event to determine whether the user was actually at the designated location during the calendar event (e.g. different building, client facility, coffee shop, restaurant, etc.). Similarly, if the tag (or one or more ngrams) associated with the calendar event indicates that the calendar event involved a "walking meeting" (or "meeting—walking"), then the classifying (at 308) may include analyzing one or more items of position information to confirm (or disconfirm) that the user was "walking" (e.g. position steadily changing, etc.) during the time in question. Additionally, if a meeting is labelled as an online meeting, productivity data (at 154) can be used to confirm or disconfirm where an online meeting app, such as Microsoft Skype for Business, was used at the time of the meeting.

Based on the foregoing description, it will be appreciated that, in at least some implementations, the classifying (at 308) may not only determine a particular tag associated with the calendar event, but may also confirm (or disconfirm) whether the user actually spent the time as indicated by the calendar event. With reference to FIG. 2, such information may therefore be useful in the process 200, such as for assessing one or more productivity metrics (at 206) or determining one or more situation-related operations (at 208). For example, the classifying of one or more calendar events (at 204, 300) shows that a user frequently fails to exercise when such calendar events are scheduled during afternoon hours, but is more inclined to participate in such calendar events are scheduled during morning hours, then the process 200 may determine this information (e.g. at 206) and may determine as a situation-related operation (at 208) to send a message to the user to remind the user of this proclivity and to recommend that an afternoon-scheduled calendar event be moved to a morning time (e.g. at 210).

With continued reference to FIG. 3, after classifying the calendar event (at 308), the process 300 may determine whether operations are complete at 310. If not, the process 300 may return to analyzing a textual content associated with a calendar event (at 302), and the above-noted operations 302-308 may be repeated. Once the process 300 is determined to be complete (at 310), the process 300 ends or continued to other operations at 312.

Figure 6:
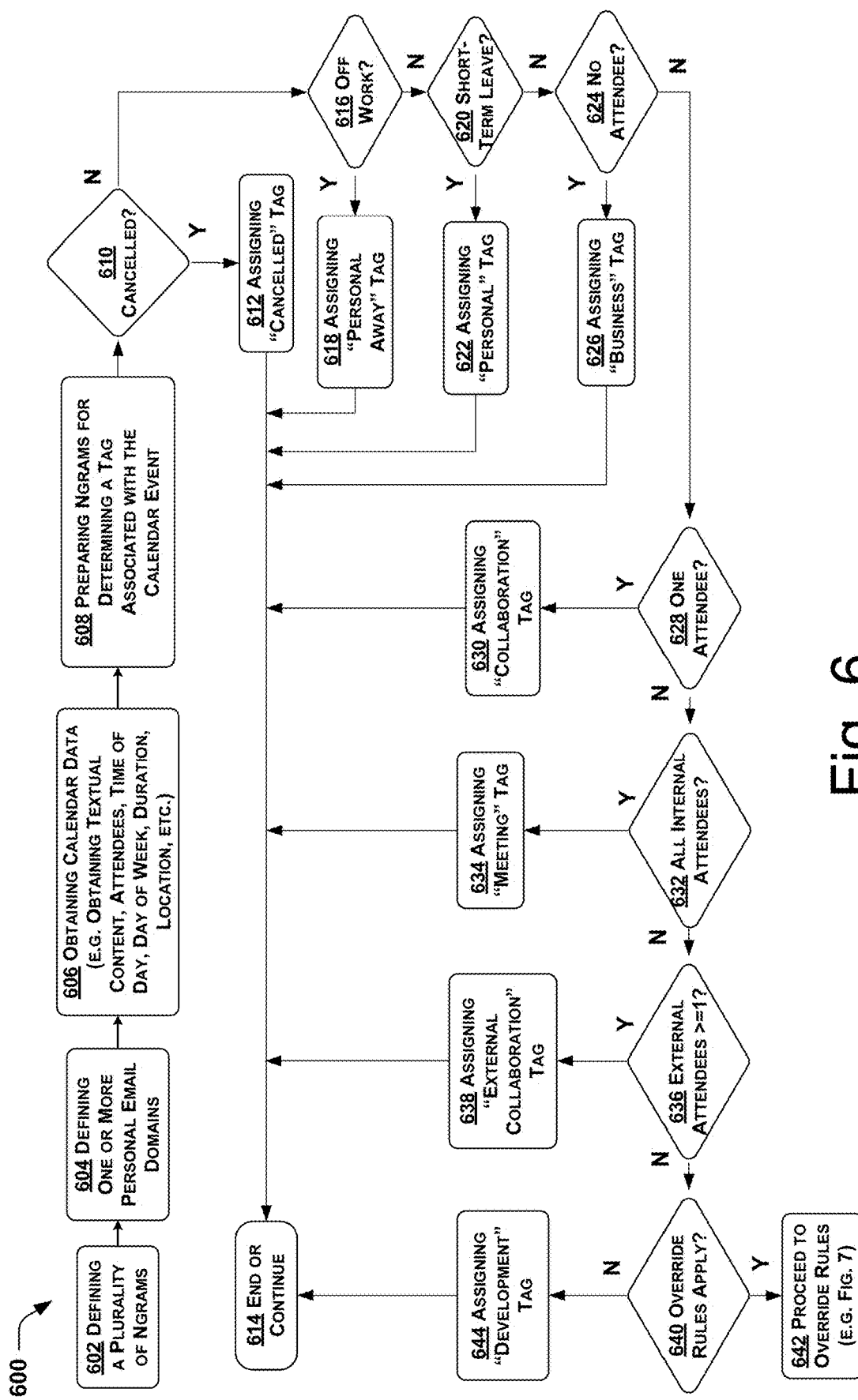
FIG. 6 shows another embodiment of a process for analyzing calendar data to assign a tag to a calendar event.

FIG. 6 shows another embodiment of a process 600 for analyzing calendar data to assign a tag to a calendar event. In this embodiment, the process 600 includes defining a plurality of ngrams (which may include one or more skip-grams) for analyzing one or more calendar events at 602. The ngrams defined at 602 are to be used during the tagging (or classifying) of one or more calendar events.

Next, the process 600 includes defining one or more personal electronic mail (or "email") domains at 604. The defining of personal email domains (at 604) may be used to determine whether attendees of calendar events are using personal email addresses or work email addresses, and in turn, this information may be used during the classifying of one or more calendar events (e.g. personal-related event, work-related event, etc.).

The process 600 further includes obtaining calendar data at 606. For example, in at least some implementations, the productivity engine 140 may obtain calendar data from the applications data 128 on the memories of one or more of the devices (110, 130, 132, 134, 138). The obtaining calendar data (at 606) may include obtaining textual content (e.g. subject heading, event body, metadata, etc.) associated with a calendar event for ngram analysis (e.g. at 306). More specifically, the obtaining calendar data (at 606) may include obtaining and decrypting one or more of textual content (e.g. subject heading, event body, metadata, etc.) or other relevant calendar data associated with the calendar event.

In at least some implementations, the obtaining calendar data (at 606) may include determining one or more attendees of the calendar event. Similarly, in at least some implementations, the obtaining calendar data (at 606) may include determining one or more of time of day, day of week, or duration of the calendar event, and may also include converting the time of the calendar event into a Universal Time Coordinated (UTC) zone value to enable comparison with other calendar events and for assessment of productivity metrics (at 206). In addition, the obtaining calendar data (at 606) may include obtaining location information (e.g. internal, external, telephone, personal domain, etc.) associated with the calendar event.

As further shown in FIG. 6, in this embodiment, the process 600 further includes preparing ngrams (which may include one or more skip-grams) for determining a tag associated with the calendar event at 608. For example, in at least some implementations, the preparing ngrams (at 608) may include lemmatizing one or more verbs contained in the textual content associated with the calendar event, generating N grams associated with the textual content (e.g. 1<=N<=3), and computing the positions of the N grams associated with the textual content.

Following preparing ngrams (which may include one or more skip-grams) (at 608), the process 600 begins performing one or more operations directed to assigning a tag to the calendar event (e.g. at 306). For example, at 610, the process 600 includes determining whether the calendar event has been cancelled. For example, the determining (at 610) may include analyzing one or more rules to determine whether the calendar event has been cancelled, such as analyzing an attribute associated with the calendar event (e.g. Boolean attribute "IsCancelled" equals "True," etc.), or analyzing whether one or more of the ngrams is or contains the term "cancel." If it is determined that the calendar event has been cancelled (at 610), then the process 600 includes assigning a "cancelled" tag to the calendar event at 612, and the process 600 then ends or continues to other operations at 614.

If it is determined that the calendar event has not been cancelled (at 610), then the process 600 includes determining whether the calendar event indicates that the user is off work for an extended period at 616. For example, in some implementations, the determination (at 616) may include analyzing a duration of a calendar event to see whether the calendar event covers an extended period (e.g. an entire work week of 120 hours or 5 days, an entire day, etc.). Similarly, in some implementations, the determination (at 616) may examine one or more ngrams (which may include one or more skip-grams) associated with the calendar event, or the location or other information associated with the calendar event, to assess whether the user is out of the office or otherwise away on personal leave (e.g. "vacation," "personal leave," "gone fishing," etc.). If it is determined that the user is off work for an extended period (at 616), then the process 600 includes assigning a "personal away" tag to the calendar event at 618, and the process 600 then ends or continues to other operations at 614.

With continued reference to FIG. 6, if it is determined that the user is not off work for an extended period (at 616), then the process 600 proceeds to determining whether the calendar event indicates that the user is out on a relatively short-term personal leave at 620. For example, in some implementations, the determination (at 620) may include analyzing a duration of a calendar event to see whether the calendar event covers a relatively short-term period (e.g. 2-8 hours, etc.). Similarly, in some implementations, the determination (at 620) may examine one or more ngrams, or the location or other information associated with the calendar event, to assess whether the user is on personal leave (e.g. "family," "medical appointment," etc.). If it is determined that the user is out on a relatively short-term personal leave (at 620), then the process 600 includes assigning a "personal" tag to the calendar event at 622, and the process 600 then ends or continues to other operations at 614.

If it is determined that the user is not out on a relatively short-term personal leave (at 620), then the process 600 includes determining whether there are no attendees (other than the user) associated with the calendar event at 624. For example, the determination (at 624) may include analyzing the calendar data associated with the calendar event to determine whether any other attendees (other than the user) are attending (or invited to attend) the calendar event. The determination (at 624) may also involve analyzing other calendar data associated with the calendar event, such as location and time information, before assigning a tag to the calendar event. As shown in FIG. 6, if it is determined that there are no attendees associated with the calendar event (at 624), then the process 600 includes assigning a "business" tag to the calendar event at 626, and the process 600 then ends or continues to other operations at 614.

If it is determined, however, that the user is not the only attendee (at 624), then the process 600 includes determining whether there are only one other attendee (other than the user) associated with the calendar event at 628. The determination (at 628) may include analyzing the calendar data associated with the calendar event to determine the number of other attendees (other than the user) that are attending (or invited to attend) the calendar event. The determination (at 628) may also involve analyzing other calendar data associated with the calendar event, such as location and time information, before assigning a tag to the calendar event. If it is determined that there is only one other attendee associated with the calendar event (at 628), then the process 600 includes assigning a "collaboration" tag to the calendar event at 630, and the process 600 then ends or continues to other operations at 614.

As further shown in FIG. 6, if it is determined that there is not only one other attendee (at 628), then the process 600 includes determining whether all other attendees are internal to the user's company (or organization) at 632. For example, in at least some implementations, the determining (at 632) may include analyzing the domain portion of the email addresses of the other attendees (or invitees) associated with the calendar event to determine whether they are all of the same email domain (e.g. company x) as the user, and if so, then it may be assumed that all attendees are employed by the same company as the user, and that therefore the attendees are all "internal" attendees. The determination (at 632) may also involve analyzing other calendar data associated with the calendar event, such as location and time information, before assigning a tag to the calendar event (e.g. to confirm that the calendar event is a business-related event). If it is determined that all other attendees are internal to the user's company (at 632), then the process 600 includes assigning a "meeting" tag to the calendar event at 634, and the process 600 then ends or continues to other operations at 614.

If it is determined that not all other attendees are internal to the user's company (at 632), then the process 600 includes determining whether there are any external attendees associated with the user's company (or organization) at 636. For example, in at least some implementations, the determining (at 636) may include analyzing the domain portion of the email addresses of the other attendees (or invitees) associated with the calendar event to determine whether they are all of the same email domain (e.g. company x) as the user, and if so, then it may be assumed that all attendees are employed by the same company as the user, and that therefore the attendees are all "internal" attendees. The determination (at 636) may also involve analyzing other calendar data associated with the calendar event, such as location and time information, before assigning a tag to the calendar event (e.g. to confirm that the calendar event is a business-related event). If it is determined that there are external attendees associated with the user's company (at 636), then the process 600 includes assigning an "external collaboration" tag to the calendar event at 638, and the process 600 then ends or continues to other operations at 614.

Finally, if it is determined that there are no external attendees associated with the user's company (at 636), the process 600 determines whether one or more user override rules apply at 640. For example, a user (or an employer or other entity) may wish to set up custom override rules that determine one or more tags to be assigned to various specific circumstances. In at least some implementations, the determining whether one or more user override rules apply (at 640) may therefore include analyzing one or more aspects of the calendar data associated with the calendar event, such as one or more of ngrams (which may include one or more skip-grams), attendees, location, or time information, to determine whether one or more override rules apply. A representative embodiment of an override rule process will be described below with reference to FIG. 7. If it is determined (at 640) that override rules do not apply, then the process 600 includes assigning a "development" tag (or other desired default tag) to the calendar event at 644, and the process 600 then ends or continues to other operations at 614. Otherwise, if it is determined (at 640) that one or more override rules do apply, then the process 600 proceeds to one or more override rules at 642, as described more fully below.

Figure 7:
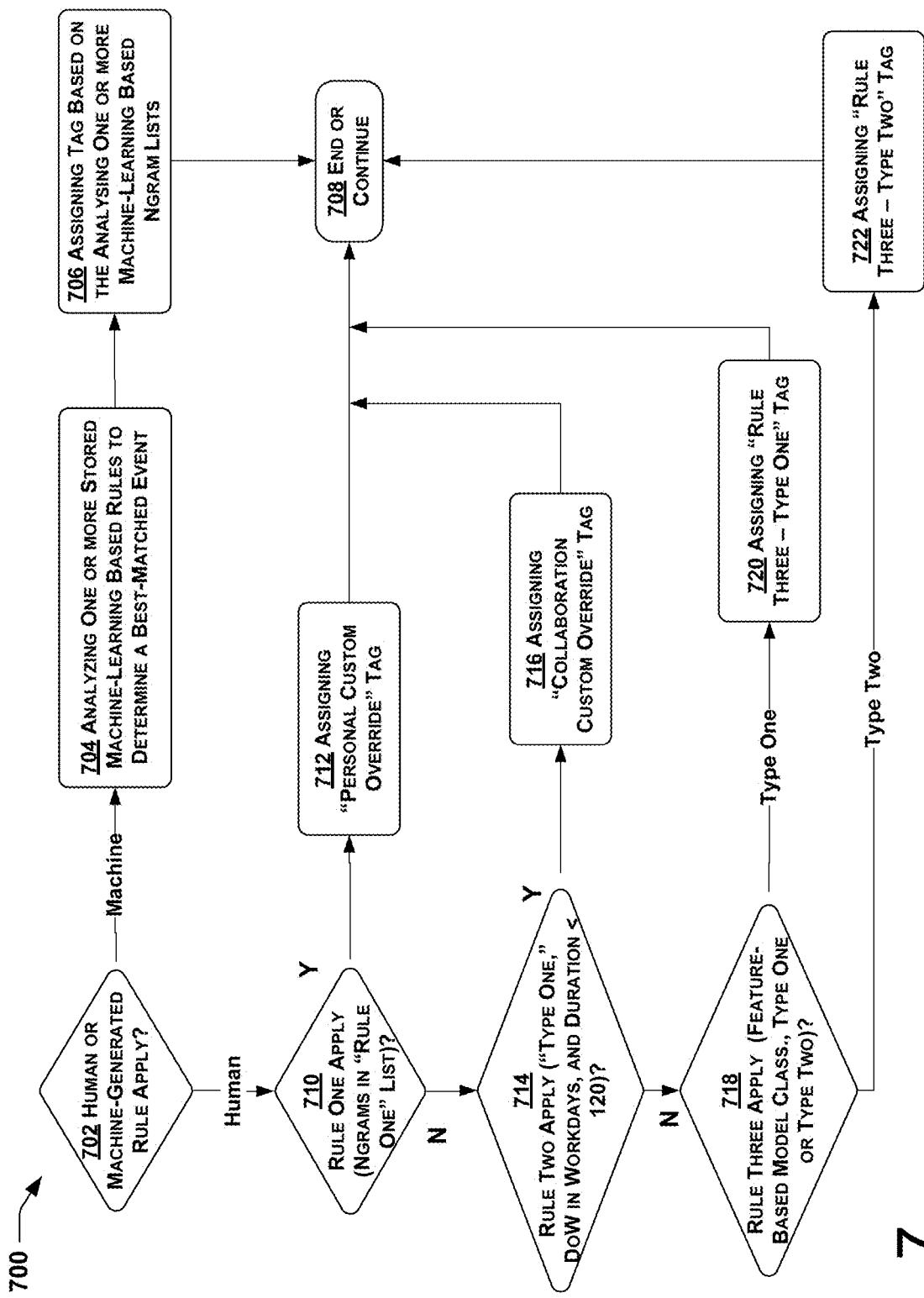
FIG. 7 shows an embodiment of a process for applying one or more override rules for assigning a tag to a calendar event.

FIG. 7 shows an embodiment of a process 700 for applying one or more override rules for assigning a tag to a calendar event. In this embodiment, the process 700 includes determining whether a human-generated override rule or machine-generated override rule applies at 702. If it is determined (at 702) that a machine-generated override rule applies, then the process 700 proceeds to analyzing one or more stored machine-learning based rules to determine to determine a best-matched (or most-closely-matched) event at 704. For example, in at least some implementations, the analyzing (at 704) may include comparing one or more ngrams (which may include one or more skip-grams) associated with the calendar event (e.g. prepared at 608) with entries associated with the one or more machine-learning based rules stored as one or more lists, such as a list of "type one" events, a list of "type two" events, or a list of other events, to determine a best-matched (or most-closely-matched) list entry. At 706, the process 700 includes assigning a tag to the calendar event based on the results of the analyzing (at 704). The process 700 then ends or continues to other operations at 708.

On the other hand, if it is determined (at 702) that a human-generated override rule applies, then in the embodiment shown in FIG. 7, the process 700 proceeds to determining whether the one or more ngrams (which may include one or more skip-grams), associated with the calendar event (e.g. prepared at 608) are in (i.e. match or relatively-closely match) a list of ngrams associated with a first rule, such as a "type two" list or a "personal matter" list, at 710. If it is determined (at 710) that the one or more ngrams associated with the calendar event are in the rule one (e.g. "personal matter") list, then the process 700 includes assigning a rule one tag (e.g. "personal custom override" tag) to the calendar event at 712. The process 700 then ends or continues to other operations at 708.

Alternately, if it is determined (at 710) that the one or more ngrams (which may include one or more skip-grams), associated with the calendar event are not in the rule one (e.g. "personal matter") list, then the process 700 includes to determining whether a second rule (or "rule two" applies at 714. are in (i.e. match or relatively-closely match) a list of ngrams associated with a second rule at 714. In the embodiment shown in FIG. 7, the second rule contains the following three conditions: one or more ngrams associated with the calendar event (e.g. prepared at 608) are in (e.g. match or relatively closely match) a "type one" list, the calendar event falls on a day of the week (DoW) normally associated with being a workday (e.g. Monday through Friday, or other custom period), and the duration of the calendar event is less than a specified period (e.g. 120 hours). If it is determined (at 714) that "rule two" applies at 714, then the process 700 includes assigning a "rule two" tag (e.g. "collaboration custom override" tag) to the calendar event at 716. The process 700 then ends or continues to other operations at 708.

As further shown in FIG. 7, if it is determined (at 714) that rule two does not apply, then the process 700 proceeds to determining whether a third rule applies at 718. In the embodiment shown in FIG. 7, the third rule may include a feature-based model classification that depends at least in part on whether the calendar event is a "type one" or "type two" event. If it is determined (at 714) that the third rule applies and the event is a "type one" event, then the process 700 proceeds to assigning a "rule three—type one" tag at 720. Otherwise, the process 700 proceeds to assigning a "rule three—type two" tag at 722. After the assigning of the "rule three" tag (at either 720 or 722), the process 700 ends or continues to other operations at 708.

Again, it will be appreciated that techniques and technologies for using an intelligent meeting classifier to assess and enhance a user's work-related productivity as disclosed herein may provide substantial operational improvements in the operations of one or more computers operated by one or more users of an environment in comparison with conventional technologies. For example, techniques and technologies in accordance with the present disclosure may advantageously enable users to more appropriately balance their activities in order to enable them to use their computers and other devices (or the one or more productivity tools operating on their computers and other devices) efficiently. For example, one or more situation-enhancing operations may encourage a user to avoid distractions or to participate in events and activities that result in one or more tasks being performed on a device more efficiently, using fewer computational operations, fewer computational processing cycles, and less energy consumption (e.g. less battery power) in comparison with conventional techniques wherein the user is less efficient due to increased interruptions or distractions from their productivity objectives. These improvements in efficiency may further translate into less wear and tear on processors, display components, circuitry, battery, and other components of devices and systems, thereby prolonging useful life and operability of such systems.

In general, techniques and technologies disclosed herein for using an intelligent meeting classifier for determining and enhancing productivity may be described in the general context of computer code or machine-useable instructions, including computer-executable instructions such as program modules, being executed by a computer or other device. Generally, program modules including routines, programs, objects, components, data structures, etc., refer to code that perform particular tasks or implement particular abstract data types. Various embodiments of the invention may be practiced in a variety of system configurations, including hand-held devices, consumer electronics, general-purpose computers, more specialty computing devices, etc. In addition, various embodiments of the invention may also be practiced in distributed computing environments (e.g. cloud-based computing systems) where tasks are performed by remote-processing devices that are linked through a communications network.

Furthermore, techniques and technologies disclosed herein for determining and enhancing productivity may be implemented on a wide variety of devices and platforms. For example, FIG. 8 shows an embodiment of a computer system 800 that may be employed for downloading visual assets for applications. As shown in FIG. 8, the example computer system environment 800 includes one or more processors (or processing units) 802, special purpose circuitry 882, memory 804, and a bus 806 that operatively couples various system components, including the memory 804, to the one or more processors 802 and special purpose circuitry 882 (e.g., Application Specific Integrated Circuitry (ASIC), Field Programmable Gate Array (FPGA), etc.).

The bus 806 may represent one or more of any of several types of bus structures, including a memory bus or memory controller, a peripheral bus, an accelerated graphics port, and a processor or local bus using any of a variety of bus architectures. In at least some implementations, the memory 804 includes read only memory (ROM) 808 and random access memory (RAM) 810. A basic input/output system (BIOS) 812, containing the basic routines that help to transfer information between elements within the system 800, such as during start-up, is stored in ROM 808.

The example system environment 800 further includes a hard disk drive 814 for reading from and writing to a hard disk (not shown), and is connected to the bus 806 via a hard disk driver interface 816 (e.g., a SCSI, ATA, or other type of interface). A magnetic disk drive 818 for reading from and writing to a removable magnetic disk 820, is connected to the system bus 806 via a magnetic disk drive interface 822. Similarly, an optical disk drive 824 for reading from or writing to a removable optical disk 826 such as a CD ROM, DVD, or other optical media, connected to the bus 806 via an optical drive interface 828. The drives and their associated computer-readable media may provide nonvolatile storage of computer readable instructions, data structures, program modules and other data for the system environment 800. Although the system environment 800 described herein employs a hard disk, a removable magnetic disk 820 and a removable optical disk 826, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

The computer-readable media included in the system memory 800 can be any available or suitable media, including volatile and nonvolatile media, and removable and non-removable media, and may be implemented in any method or technology suitable for storage of information such as computer-readable instructions, data structures, program modules, or other data. More specifically, suitable computer-readable media may include random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information. As used herein, the terms "computer-readable media" and "computer-readable storage media" are not intended to include transitory signals.

As further shown in FIG. 8, a number of program modules may be stored on the memory 804 (e.g., the ROM 808 or the RAM 810) including an operating system 830, one or more application programs 832, other program modules 834, and program data 836 (e.g., applications data 128, productivity data 154, etc.). Alternately, these program modules may be stored on other computer-readable media, including the hard disk, the magnetic disk 820, or the optical disk 826. For purposes of illustration, programs and other executable program components, such as the operating system 830, are illustrated in FIG. 8 as discrete blocks, although it is recognized that such programs and components reside at various times in different storage components of the system environment 800, and may be executed by the processor(s) 802 or the special purpose circuitry 882 of the system environment 800.

A user may enter commands and information into the system environment 800 through input devices such as a keyboard 838 and a pointing device 840. Other input devices (not shown) may include a microphone, joystick, game pad, satellite dish, scanner, or the like. Still other input devices, such as a Natural User Interface (NUI) device 869, or user interface 825, include or involve one or more aspects of a Natural User Interface (NUI) that enables a user to interact with the system environment 800 in a "natural" manner, free from artificial constraints imposed by conventional input devices such as mice, keyboards, remote controls, and the like. For example, in at least some embodiments, the NUI device 869 may rely on speech recognition, touch and stylus recognition, one or more biometric inputs, gesture recognition both on screen and adjacent to the screen, air gestures, head and eye (or gaze) tracking, voice and speech, vision, touch, hover, gestures, machine intelligence, as well as technologies for sensing brain activity using electric field sensing electrodes (EEG and related methods) to receive inputs. In addition, in at least some embodiments, an NUI may involve or incorporate one or more aspects of touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface.

More specifically, in at least some embodiments, the NUI device 869 may be configured to detect one or more contacts, or one or more non-contacting gestures that are indicative of one or more characteristics, selections or actions by a user. For example, in at least some implementations, the NUI device 869 may include a non-contact gesture detection device operable to detect gestures such as a Kinect® system commercially-available from the Microsoft Corporation, a Wii® system commercially-available from Nintendo of America, Inc., a HoloLens™ system commercially-available from the Microsoft Corporation, or any of a variety of eye or gaze tracking devices, including, for example, the devices, systems, and technologies of Tobii Technology, Inc. (e.g. Pro Glasses 2, StarVR, Tobii Eye-Chip, Model 1750 Eye Tracker, etc.), or those of Xlabs Pty Ltd., or any other suitable devices, systems, and technologies. In this way, the NUI device 869 may be configured to detect at least one of contacts or non-contacting gestures by a user that are indicative of characteristics, selections or actions for performing operations as described above.

These and other input devices are connected to the processing unit 802 and special purpose circuitry 882 through an interface 842 or a communication interface 846 (e.g. video adapter) that is coupled to the system bus 806. A user interface 825 (e.g., display, monitor, or any other user interface device) may be connected to the bus 806 via an interface, such as a video adapter 846. In addition, the system environment 800 may also include other peripheral output devices (not shown) such as speakers and printers.

The system environment 800 may operate in a networked environment using logical connections to one or more remote computers (or servers) 858. Such remote computers (or servers) 858 may be a personal computer, a server, a router, a network PC, a peer device or other common network node. The logical connections depicted in FIG. 8 include one or more of a local area network (LAN) 848 and a wide area network (WAN) 850. Such networking environments are commonplace in offices, enterprise-wide computer networks, intranets, and the Internet. In this embodiment, the system environment 800 also includes one or more broadcast tuners 856. The broadcast tuner 856 may receive broadcast signals directly (e.g., analog or digital cable transmissions fed directly into the tuner 856) or via a reception device (e.g., via an antenna 857, a satellite dish, etc.).

When used in a LAN networking environment, the system environment 800 may be connected to the local area network 848 through a network interface (or adapter) 852. When used in a WAN networking environment, the system environment 800 typically includes a modem 854 or other means (e.g., router) for establishing communications over the wide area network 850, such as the Internet. The modem 854, which may be internal or external, may be connected to the bus 806 via the serial port interface 842. Similarly, the system environment 800 may exchange (send or receive) wireless signals 853 with one or more remote devices using a wireless interface 855 coupled to a wireless communicator 857 (e.g., an antenna, a satellite dish, a transmitter, a receiver, a transceiver, a photoreceptor, a photodiode, an emitter, a receptor, etc.).

In a networked environment, program modules depicted relative to the system environment 800, or portions thereof, may be stored in the memory 804, or in a remote memory storage device. More specifically, as further shown in FIG. 8, a special purpose component 880 may be stored in the memory 804 of the system environment 800. The special purpose component 880 may be implemented using software, hardware, firmware, or any suitable combination thereof. In cooperation with the other components of the system environment 800, such as the processing unit 802 or the special purpose circuitry 882, the special purpose component 880 may be operable to perform one or more implementations of techniques and technologies described above (e.g., process 200 of FIG. 2, process 300 of FIG. 3, process 600 of FIG. 6, process 700 of FIG. 7, one or more operations described above with respect to FIGS. 1-7, any combinations thereof, etc.).

Generally, application programs and program modules executed on the system environment 800 may include routines, programs, objects, components, data structures, etc., for performing particular tasks or implementing particular abstract data types. These program modules and the like may be executed as a native code or may be downloaded and executed, such as in a virtual machine or other just-in-time compilation execution environments. Typically, the functionality of the program modules may be combined or distributed as desired in various implementations.

Techniques and technologies for determining and enhancing productivity in accordance with the present disclosure are not necessarily limited to the particular embodiments described above. It will be appreciated that the embodiments described herein are not intended to be exhaustive of all possible embodiments in accordance with the present disclosure, and that additional embodiments may be conceived based on the subject matter disclosed herein. For example, it should be appreciated that at least some of the various components and aspects of the described embodiments may be eliminated to create additional embodiments, or may be variously combined or re-ordered to create still further embodiments. In view of the disclosure of techniques and technologies for determining and enhancing productivity as disclosed herein, a few representative embodiments are summarized below.

For example, in at least some embodiments, a system for assessing and enhancing work-related productivity includes a processing component operatively coupled to a memory; a productivity analyzer at least partially disposed in the memory, the productivity analyzer including one or more instructions that when executed by the processing component perform operations including: classifying one or more calendar events based at least partially on calendar data associated with one or more users; assessing one or more productivity metrics based at least partially on one or more calendar event classifications; determining one or more situation-enhancing operations based on the assessed one or more productivity metrics; and performing the one or more situation-enhancing operations.

In at least some implementations, the classifying one or more calendar events based at least partially on calendar data associated with one or more users comprises: analyzing a textual content associated with a calendar event to determine one or more ngrams associated with the textual content of the calendar event; analyzing at least the one or more ngrams associated with the calendar event to assign a tag associated with the calendar event; and classifying the calendar event based at least partially on the tag associated with the calendar event. For example, in some implementations, analyzing a textual content associated with a calendar event to determine one or more ngrams associated with the textual content of the calendar event comprises analyzing a textual content associated with a calendar event to determine one or more ngrams, including one or more skip-grams, associated with the textual content of the calendar event.

In other implementations, the analyzing a textual content associated with a calendar event to determine one or more ngrams associated with the textual content of the calendar event comprises: analyzing a subject heading associated with a calendar event to determine one or more ngrams associated with the subject heading of the calendar event. In further implementations, the analyzing a textual content associated with a calendar event to determine one or more ngrams associated with the textual content of the calendar event comprises: analyzing a textual content including at least one of an event body or a metadata associated with a calendar event to determine one or more ngrams associated with the a textual content of the calendar event.

In at least some alternate implementations, the classifying one or more calendar events based at least partially on calendar data associated with one or more users comprises: analyzing a textual content associated with a calendar event to determine one or more ngrams associated with the textual content of the calendar event; determining one or more additional aspects associated with the calendar event; analyzing at least the one or more ngrams and the one or more additional aspects associated with the calendar event to assign a tag associated with the calendar event; and classifying the calendar event based at least partially on the tag associated with the calendar event.

In some implementations, the analyzing at least the one or more ngrams, and the one or more additional aspects associated with the calendar event to assign a tag associated with the calendar event comprises: analyzing at least the one or more ngrams and the one or more additional aspects associated with the calendar event to assign a tag associated with the calendar event, the one or more additional aspects including at least one of a number of attendees or an identity of attendees associated with the calendar event. In further implementations, the analyzing at least the one or more ngrams and the one or more additional aspects associated with the calendar event to assign a tag associated with the calendar event comprises: analyzing at least the one or more ngrams, and the one or more additional aspects associated with the calendar event to assign a tag associated with the calendar event, the one or more additional aspects including at least one of a time of calendar event or a duration associated with the calendar event. And in still other implementations, the analyzing at least the one or more ngrams, and the one or more additional aspects associated with the calendar event to assign a tag associated with the calendar event comprises: analyzing at least the one or more ngrams and the one or more additional aspects associated with the calendar event to assign a tag associated with the calendar event, the one or more additional aspects including at least one of at least one of a location or a change of location of at least one attendee during a time of the calendar event.

In addition, in at least some implementations, the classifying the calendar event based at least partially on the tag associated with the calendar event comprises: classifying the calendar event based at least partially on the tag and at least partially on a supplemental information associated with the calendar event. In some implementations, the classifying the calendar event based at least partially on the tag and at least partially on a supplemental information associated with the calendar event comprises: classifying the calendar event based at least partially on the tag and at least partially on a supplemental information associated with the calendar event, the supplemental information associated with the calendar event including at least one item of biometric data associated with at least one attendee during a time of the calendar event. In at least some implementations, the at least one item of biometric data comprises: at least one of respiration rate, respiration volume, respiration duration, respiration pattern, heart rate, blood pressure, temperature, perspiration, skin conductivity, brain activity data, brain waves, brain temperature data, or electroencephalogram (EEG) data.

In further implementations, the classifying the calendar event based at least partially on the tag and at least partially on a supplemental information associated with the calendar event comprises: classifying the calendar event based at least partially on the tag and at least partially on a supplemental information associated with the calendar event, the supplemental information associated with the calendar event including at least one of a location or a change of location of at least one attendee during a time of the calendar event. Alternately, in at least some implementations, the performing the one or more situation-enhancing operations comprises: performing the one or more situation-enhancing operations, the one or more situation-enhancing operations including at least one of disabling or limiting a functionality of an application used by at least one attendee of the calendar event.

In addition, in at least some implementations, a method for assessing and enhancing a work-related productivity using one or more processing components of a computing device comprises: analyzing a textual content associated with a calendar event to determine one or more ngrams, associated with the textual content of the calendar event; analyzing at least the one or more ngrams associated with the calendar event to assign a tag associated with the calendar event; and classifying the calendar event based at least partially on the tag associated with the calendar event; assessing one or more productivity metrics based at least partially on the one or more calendar event classifications; determining one or more situation-enhancing operations based on the assessed one or more productivity metrics; and performing the one or more situation-enhancing operations.

In some implementations, the textual content associated with the calendar event comprises: at least one of a subject heading, an event body, or a metadata associated with the calendar event. In other implementations, a method further comprises determining one or more additional aspects associated with the calendar event, and wherein analyzing at least the one or more ngrams, associated with the calendar event to assign a tag associated with the calendar event includes analyzing at least the one or more ngrams and the one or more additional aspects associated with the calendar event to assign a tag associated with the calendar event. In at least some other implementations, the one or more additional aspects associated with the calendar event comprises: at least one of a number of attendees, an identity of attendees, a time of calendar event, a duration of calendar event, a location or a change of location of at least one attendee during a time of the calendar event.

In further implementations, the analyzing at least the one or more ngrams associated with the calendar event to assign a tag associated with the calendar event comprises analyzing at least the one or more ngrams, including one or more skip-grams, associated with the calendar event to assign a tag associated with the calendar event. Alternately, in some implementations, the classifying the calendar event based at least partially on the tag associated with the calendar event comprises: classifying the calendar event based at least partially on the tag and at least partially on a supplemental information associated with the calendar event, the supplemental information associated with the calendar event including at least one item of biometric data associated with at least one attendee during a time of the calendar event, a location or a change of location of at least one attendee during a time of the calendar event.

And in at least some further implementations, a system for assessing and enhancing work-related productivity, comprises: circuitry for analyzing a textual content associated with a calendar event to determine one or more ngrams associated with the textual content of the calendar event; circuitry for analyzing at least the one or more ngrams associated with the calendar event to assign a tag associated with the calendar event; circuitry for classifying the calendar event based at least partially on the tag associated with the calendar event; circuitry for assessing one or more productivity metrics based at least partially on the one or more calendar event classifications; circuitry for determining one or more situation-enhancing operations based on the assessed one or more productivity metrics; and circuitry for performing the one or more situation-enhancing operations.

In at least some implementations, circuitry for classifying the calendar event based at least partially on the tag associated with the calendar event comprises: circuitry for classifying the calendar event based at least partially on the tag and at least partially on a supplemental information associated with the calendar event, the supplemental information associated with the calendar event including at least one item of biometric data associated with at least one attendee during a time of the calendar event, a location or a change of location of at least one attendee during a time of the calendar event.

CONCLUSION

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. It will be appreciated that the embodiments of techniques and technologies described above are not exhaustive of all possible embodiments considered to be within the scope of the present disclosure, and that additional embodiments may be conceived based on the subject matter disclosed herein. For example, in alternate embodiments one or more elements or components of the techniques and technologies described above may be re-arranged, re-ordered, modified, or even omitted to provide additional embodiments that are still considered to be within the scope of the present disclosure.

Alternately, or in addition, the techniques and technologies described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Although the subject matter has been described in language specific to structural features and/or acts, it is to be understood that the subject matter defined in the appended claims is not necessarily limited to the specific features or acts described. Rather, the specific features and acts described above are disclosed as examples of implementing the claims and other equivalent features and acts are intended to be within the scope of the claims. The various embodiments and implementations described above are provided by way of illustration only and should not be construed as limiting various modifications and changes that may be made to the embodiments and implementations described above without departing from the spirit and scope of the disclosure.

What is claimed is:

1. A system for modifying a user interface provided via a software application, the system comprising:
 a processing component operatively coupled to a memory;
 a productivity analyzer at least partially disposed in the memory, the productivity analyzer including one or more instructions that when executed by the processing component perform operations including:
  assigning a classification to a calendar event based at least partially on calendar data by:
   analyzing a textual content associated with the calendar event to determine one or more ngrams associated with the textual content of the calendar event,
   determining a subset of possible tags associated with the calendar event based on the one or more ngrams,
   determining one or more additional aspects associated with the calendar event,
   assigning a tag to the calendar event from the subset of possible tags based on the one or more additional aspects associated with the calendar event, and
   assigning the classification to the calendar event based at least partially on the tag associated with the calendar event;
  assessing a metric based at least partially on the classification assigned to the calendar event;
  determining a modification operation for the software application based at least partially on the assessed metric; and performing the modification operation for the software application to modify functionality of the user interface provided via the software application.

2. The system of claim 1, wherein analyzing the textual content associated with the calendar event to determine the one or more ngrams associated with the textual content of the calendar event comprises:
analyzing the textual content associated with the calendar event to determine the one or more ngrams, including one or more skip-grams, associated with the textual content of the calendar event.

3. The system of claim 1, wherein analyzing the textual content associated with the calendar event to determine the one or more ngrams associated with the textual content of the calendar event comprises:
analyzing a subject heading associated with the calendar event to determine one or more ngrams associated with the subject heading of the calendar event.

4. The system of claim 1, wherein analyzing the textual content associated with the calendar event to determine the one or more ngrams associated with the textual content of the calendar event comprises:
analyzing the textual content including at least one of an event body or a metadata associated with the calendar event to determine the one or more ngrams associated with the textual content of the calendar event.

5. The system of claim 1, wherein the one or more additional aspects include at least one selected from a group consisting of a number of attendees associated with the calendar event, an identity of attendees associated with the calendar event, a time of the calendar event, a duration associated with the calendar event, a location, and a change of location of at least one attendee during the time of the calendar event.

6. The system of claim 1, wherein assigning the classification to the calendar event based at least partially on the tag associated with the calendar event comprises:
assigning the classification to the calendar event based at least partially on the tag and at least partially on supplemental information associated with the calendar event.

7. The system of claim 6, wherein the supplemental information associated with the calendar event includes at least one item of biometric data associated with at least one attendee during a time of the calendar event.

8. The system of claim 6, wherein the supplemental information associated with the calendar event includes at least one of a location or a change of location of the at least one attendee during a time of the calendar event.

9. A method for modifying a user interface provided via a software application using one or more processing components of a computing device, the method comprising:
analyzing a textual content associated with a calendar event to determine one or more ngrams associated with the textual content of the calendar event;
determining a subset of possible tags associated with the calendar event based on the one or more ngrams;
determining one or more additional aspects associated with the calendar event;
assigning a tag to the calendar event from the subset of possible tags based on the one or more additional aspects associated with the calendar event;
assigning a classification to the calendar event based at least partially on the tag associated with the calendar event;
assessing a metric based at least partially on the classification assigned to the calendar event;
determining a modification operation for the software application based at least partially on the metric; and
performing the modification operation for the software application to modify functionality of the user interface provided via the software application.

10. The method of claim 9, wherein analyzing the textual content associated with the calendar event to determine the one or more ngrams associated with the textual content of the calendar event comprises:
analyzing the textual content associated with the calendar event to determine the one or more ngrams, including one or more skip-grams, associated with the textual content of the calendar event.

11. The method of claim 9, wherein the textual content associated with the calendar event comprises:
at least one of a subject heading, an event body, or a metadata associated with the calendar event.

12. The method of claim 9, wherein assigning the classification to the calendar event based at least partially on the tag associated with the calendar event comprises:
assigning the classification to the calendar event based at least partially on the tag and at least partially on supplemental information associated with the calendar event, the supplemental information associated with the calendar event including at least one selected from a group consisting of biometric data associated with at least one attendee during a time of the calendar event, a location, and a change of location of the at least one attendee during the time of the calendar event.

13. A system for modifying a user interface provided via a software application, the system comprising:
circuitry for analyzing a textual content associated with a calendar event to determine one or more ngrams associated with the textual content of the calendar event;
circuitry for determining a subset of possible tags associated with the calendar event based on the one or more ngrams;
circuitry for determining one or more additional aspects associated with the calendar event;
circuitry for assigning a tag to the calendar event from the subset of possible tags based on the one or more additional aspects associated with the calendar event;
circuitry for assigning a classification to the calendar event based at least partially on the tag associated with the calendar event;
circuitry for assessing a metric based at least partially on the classification assigned to the calendar event;
circuitry for determining a modification operation for the software application based at least partially on the assessed metric; and
circuitry for performing the modification operation for the software application to modify functionality of the user interface provided via the software application.

* * * * *